United States Patent [19]

Askew

[11] Patent Number: 5,033,557
[45] Date of Patent: Jul. 23, 1991

[54] HYDRAULIC DRILLING JAR

[75] Inventor: Warren E. Askew, Houston, Tex.

[73] Assignee: Anadrill, Inc., Sugar Land, Tex.

[21] Appl. No.: 519,627

[22] Filed: May 7, 1990

[51] Int. Cl.$^5$ .......................... E21B 4/06; E21B 4/14
[52] U.S. Cl. ..................................... 175/297; 166/178
[58] Field of Search ............... 175/297, 296, 293, 317, 175/299; 166/301, 99, 178; 173/134

[56] References Cited

U.S. PATENT DOCUMENTS

| | | | |
|---|---|---|---|
| 3,209,843 | 10/1965 | Webb | 175/297 |
| 3,215,211 | 11/1965 | Webb | 175/296 |
| 3,221,826 | 12/1965 | Webb | 175/297 |
| 3,388,755 | 6/1968 | Webb | 175/297 |
| 3,403,739 | 10/1968 | Brown | 173/73 |
| 3,562,807 | 2/1971 | Slator et al. | 175/297 |
| 3,566,981 | 3/1971 | Love | 175/297 |
| 3,570,612 | 3/1971 | Slator | 175/297 |
| 3,599,735 | 8/1971 | Slator et al. | 175/293 |
| 3,709,478 | 1/1973 | Kisling, III | 267/137 |
| 3,955,634 | 5/1976 | Slator et al. | 175/297 |
| 3,987,858 | 10/1976 | Slator et al. | 175/297 |
| 4,027,816 | 6/1977 | Slator et al. | 277/188 R |
| 4,076,436 | 2/1978 | Slator et al. | 403/343 |
| 4,081,043 | 3/1978 | Juergens | 175/297 |
| 4,109,736 | 8/1978 | Webb et al. | 175/297 |
| 4,298,078 | 11/1981 | Lawrence | 175/72 |
| 4,361,195 | 11/1982 | Evans | 175/297 |
| 4,394,883 | 7/1983 | Briscoe | 175/304 |
| 4,463,815 | 8/1984 | Jurgens et al. | 175/302 |
| 4,566,546 | 1/1986 | Evans | 175/297 |
| 4,582,148 | 4/1986 | Walter | 175/297 |
| 4,828,048 | 5/1989 | Mayer et al. | 173/134 |
| 4,844,183 | 7/1989 | Evans | 175/296 |
| 4,846,273 | 7/1989 | Anderson | 175/297 X |

OTHER PUBLICATIONS

"Drilling Dynamics During Jar Operation", Marcus R. Skeem et al., SPE Paper No. 7521, Nov. 1979.
"Transient Dynamic Analysis of the Drillstring under Jarring Operation Using Finite Element Method", M. S. Kalsi et al., SPE/IADC 13446, Mar. 6-8, 1985.
"Drilling Jars", Hydra-Jar Operation Manual No. 6-80.
"The Li Rotary Drilling Jar", Dailey Oil Tools, Inc.
"Drilling Tools", Dresser Industries, Inc.
"Bowen Hydromechanical Drilling Jars", Instruction Manual No. 5/4200, Jan. 1978.

Primary Examiner—Stephen J. Novosad
Attorney, Agent, or Firm—David L. Mosely; John J. Ryberg

[57] ABSTRACT

In accordance with an illustrative embodiment of the present invention, a hydraulic drilling jar includes a mandrel and a housing movable between extended and retracted relative positions to deliver jarring blows to a struck object, a piston on the mandrel that slides in a cylinder in the housing, and a restriction assembly on the housing having an internal seal that engages an enlarged section of the mandrel to enclose a high pressure, oil-filled chamber between the piston and the restriction assembly, the restriction assembly including a pin check valve that provides a very slow leakage of oil from the high pressure chamber while the enlarged section of the mandrel is engaged with the seal. An oil-filled compensating chamber on the opposite side of the restriction means from the high pressure chamber has its pressure equalized with the pressure inside the mandrel by ports through the wall of the mandrel.

40 Claims, 3 Drawing Sheets

HYDRAULIC DRILLING JAR

FIELD OF THE INVENTION

This invention relates generally to jars that are used to free objects that have become stuck in a well bore, and specifically to a new and improved hydraulic drilling jar that can be operated to deliver repeated upward and downward impact blows to a drill string in the event it becomes stuck in the borehole during the drilling process.

BACKGROUND OF THE INVENTION

The use of hydraulic jars has been limited in the past primarily to "fishing" operations because of the hostile and rugged conditions encountered in drilling. For drilling use, the jar must be able to withstand long periods of service downhole and still remain operational when needed. Indeed a drilling jar may remain downhole for many days or even weeks before the drilling string is tripped to change the bit. The drilling process by its nature involves high torsional stresses and vibration, which a drilling jar must be rugged enough to withstand.

Prior art hydraulic drilling jars such as those shown in Love U.S. Pat. No. 3,566,981, Webb U.S. Pat. No. 4,109,736, and Sutliff U.S. Pat. No. 2,645,459, use a metering sleeve on the outside of a mandrel as a tripping mechanism. The sleeve is pulled through a reduced diameter section of the housing and into an enlarged diameter section thereof as hydraulic oil leaks through a small clearance space between the outer surface of the sleeve and the inner wall of such reduced diameter section. The slow leakage retards longitudinal movement of the mandrel to enable a stretch to be taken in the pipe string. When the metering sleeve reaches the enlarged diameter, a large bypass area is presented that allows free movement of the mandrel until the impact surfaces engage. During reverse movement of the mandrel, the lower end of the sleeve moves away from a seat on the mandrel to allow unrestricted movement to the cocked position. Although jars that include such metering sleeves have been widely used, the sliding surfaces are subject to wear which reduces their effectiveness as high pressure seals. The sleeves also are very expensive to manufacture to the close tolerances that are required. Other prior art jars have high pressure seals that are subject to contamination by drilling mud in the borehole, which reduces seal life. All of the prior art metering sleeve designs that applicant is aware of have internal chambers that are compensated to the outside by holes in the housing. Such holes create weak points that can cause fatigue failures when subjected to cyclical stresses during bent rotation.

The general object of the present invention is to provide a new and improved hydraulic jar that alleviates the above-mentioned problems with prior devices.

Another object of the present invention is to provide a new and improved jar of the type described having a metering valve that is easy and inexpensive to make and replace, and which eliminates the need to manufacture large and expensive parts that heretofore have had to be machined to close tolerances.

Yet another object of the present invention is to provide a new and improved jar having internal compensation so that no external holes are present which present weak points that can fail due to cyclical stresses in bent rotation.

Still another object of the present invention is to provide a new and improved jar that is uniquely arranged such that all high pressure seals are completely isolated from drilling mud to ensure longer life by eliminating contamination.

Another object of the present invention is to provide a new and improved drilling jar that includes a damping feature which prevents generation of a tensile shock wave in case the housing moves downward relative to the mandrel in a highly deviated borehole.

SUMMARY OF THE INvENTION

These and other objects of the present invention are attained through the provision of a hydraulic drilling jar apparatus that includes a mandrel that is telescopically disposed within a housing for movement between extended and contracted relative positions. The upper end of the mandrel and the lower end of the housing having threads whereby the jar can be connected into a drill string. Splines on the mandrel and the housing couple them together for relative sliding movement and for the transmission of drilling torque. In order to temporarily retard relative movement of the mandrel and housing so that potential energy can be stored in the pipe string, a hydraulic system is provided that includes a piston on the mandrel that slides within a cylinder in the housing. A flow restriction means on the housing is spaced from the piston to provide a high pressure chamber that is filled with hydraulic oil. The flow restriction means has a central bore through which the mandrel extends and a hole radially offset from such central bore that receives a pin valve. A predetermined clearance between the pin valve and the hole provides for highly restricted flow of oil from the high pressure chamber. An enlarged diameter valve head on the mandrel is arranged to sealingly engage the bore of the flow restriction means so that further movement of the mandrel and the piston causes a controlled leakage of oil past the pin valve and into a compensating chamber adjacent the flow restriction means. The controlled leakage retards movement of the mandrel so that, in the case of upward jarring, a stretch can be taken in the pipe string. When the mandrel head clears the bore of the restriction means, the mandrel is free to move upward relative to the housing to cause a hammer surface to engage an anvil surface in a violent manner. A second restriction system that is the mirror image of the above, and a second valve head on the mandrel, adapt the jar of the present invention for hitting in the downward direction also. The spline chamber and both compensating chambers are enclosed by floating pistons that are communicated with the inner bore of the mandrel, so as to provide internal pressure compensation. All high pressure seals used in the present invention are totally isolated from drilling mud to provide optimum seal life.

BRIEF DESCRIPTION OF THE DRAWINGS

The present invention has other objects, features and advantages that will become more clearly apparent in connection with the following detailed description of a preferred embodiment, taken in conjunction with the appended drawings in which.

DETAILED DESCRIPTION OF A PREFERRED EMBODIMENT

Figures 1, 2A:
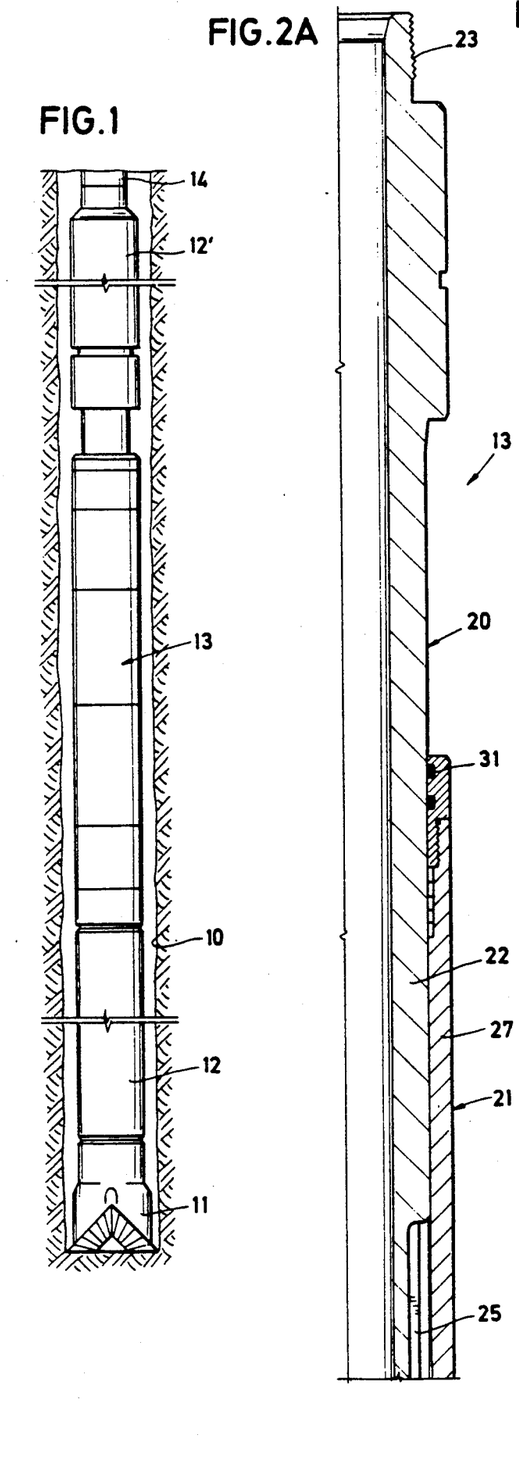
FIG. 1 is a schematic view of a drilling string including a jar in accordance with the present invention.
FIGS. 2A–2E are longitudinal right-side sectional views of the new and improved hydraulic jar showing the same in its cocked position, each successive figure being a lower continuation to the preceding figure.

Referring initially to FIG. 1, a bore hole 10 is being drilled into the earth by a drill bit 11 using a typical rotary process. A length of heavy drill collars 12 is attached above the bit 11 to provide the necessary weight so that the bit will make hole. A jar 13 in accordance with the present invention is connected in the drill collar string 12, usually but not necessarily toward the upper end thereof above the neutral point. Other drill collars 12' can be connected above the jar 13. A drill string 14 composed of joints of drill pipe extend upward to the top of the well. Drilling mud is circulated by pumps down through the drill pipe 14 and the collars 12 where it exists through jets in the bit 11 and returns to the surface through the annulus between the drill string and the well bore wall. The mud has a hydrostatic head that is higher that formation fluid pressure to prevent a blow-out, and the mud cleans the bit 11 and carries cuttings uphole.

Figure 2B:
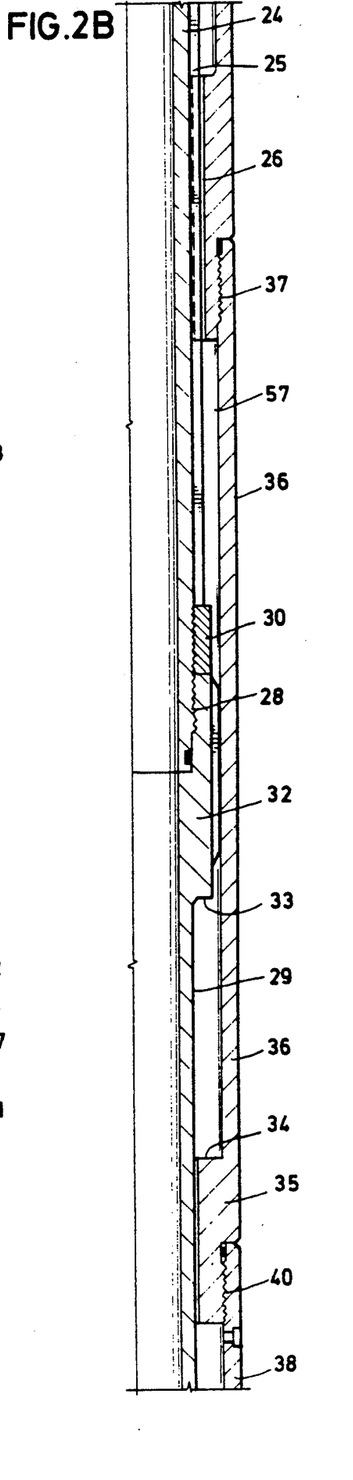

Referring now to FIGS. 2A to 2E, the hydraulic drilling jar 13 that is constructed in accordance with the present invention comprises a mandrel assembly 20 that it telescopically disposed within a housing assembly 21. The mandrel assembly 20 includes a spline mandrel 22 having threads 23 by which it can be connected to the pipe that extends upward toward the surface. A lower portion 24 of the spline mandrel 22 has external splines 25 that mesh with internal splines 26 on a spline housing 27 to provide a sliding and torque transmitting connection. A seal 31 on the upper end of the spline housing 27 engages the outer surface of the spline mandrel 22 to prevent entry of drilling mud. As shown in FIG. 2B, the lower end of the spline mandrel 20 is threadedly connected at 28 to a knocker mandrel 29. A jam nut 30 can be used to prevent accidental back-off of the thread 28, and provides a hammer surface that can engage an anvil surface provided by the lower end of the splines 26. The upper end portion 32 of the knocker mandrel 29 has a thickened cross-section to provide a downward facing hammer surface 33. The surface 33 faces an anvil surface 34 on an inwardly directed shoulder 35 of the knocker housing 36 that has its upper end threaded at 37 to the lower end of the spline housing 27.

The lower end of the knocker mandrel 29 is threaded at 48 (FIG. 2C) to the upper end of the upper pressure mandrel 42. An outwardly directed shoulder 43 having one or more radial ports 44 is formed at the upper end of the upper pressure mandrel 42. The ports 44 communicate the annular spaces 45 and 46 immediately above and below the shoulder 43 with the internal bore 47 of the mandrel assembly 20. An annular floating piston 50 having internal and external seals 51 and 52 that engage walls 53 and 54 of the knocker mandrel 29 and the compensating housing member 38, respectively, functions to equalize the pressure in the bore 47 with the generally annular region between the knocker mandrel 29 and the knocker housings 38 and 36, as well as the internal area 57 where the splines 25, 26 are located. The piston 50 also allows for volume changes due to thermal expansion. The floating piston 50 is biased upward by a coil spring 58 that reacts between the lower face on the floating piston 50 and the upper face of the shoulder 43. A second floating piston 60 is positioned below the shoulder 43 and equalizes internal bore pressure with fluid pressure in the annular space 61 between the upper pressure mandrel 42 and the upper pressure housing 38. Hereagain the piston 60 carries inner and outer seals 63 and 64 to prevent fluid leakage past it, and a coil spring 65 biases the floating piston 60 downward.

The high pressure portion of the jar 13 includes upper and lower mandrel sections 42 and 66, and the pressure housing section 67. An outwardly extending shoulder 69 (FIG. 2D) at the upper end of mandrel section 66 carries a high pressure seal 70 to provide a piston that slides against the inner wall 72 of the housing section 67. The shoulder 69 is threaded to the lower end of the pressure mandrel 42 at 39. An upper metering assembly 74 is mounted on the lower end of housing 38, and a lower metering assembly 75 that is a mirror image of upper assembly 74 is mounted on the upper end of the lower housing member 68. The annular space 76 between the piston 69 and upper metering assembly 74 defines an upper high pressure chamber, and the annular space 77 between the lower metering assembly 75 and the piston 69 defines a lower high pressure chamber. The annular space 61 between the members 42 and 38 forms a compensating chamber that is associated with the high pressure chamber 76, and the lower annular space 84 between the members 66 and 68 provides a compensating chamber that is associated with the lower high pressure chamber 77. The high pressure chambers and the compensating chambers are all filled with hydraulic oil of a suitable viscosity.

The upper end of the compensating chamber 61 is defined by the floating piston 60. The lower end of the compensating chamber 84 is defined by another floating piston 82 (FIG. 2E) that is biased upward by a spring 86. The spring 86 rests on a ring 87 that is supported on the mandrel 66 by a sleeve 88 and a lock ring 89. Inner and outer seal rings 82, 83 prevent fluid leakage. The lower face of the piston 85 is in communication with the bore 47 of the mandrel 20 by an open area 87'. The pistons 60, 85, and 50 allow pressure equalization and volume changes due to thermal effects, while preventing contamination of the oil in the chambers 57, 61, 76, 77 and 84, as well as all the high pressure seals, with drilling mud.

Figures 2C, 2D:
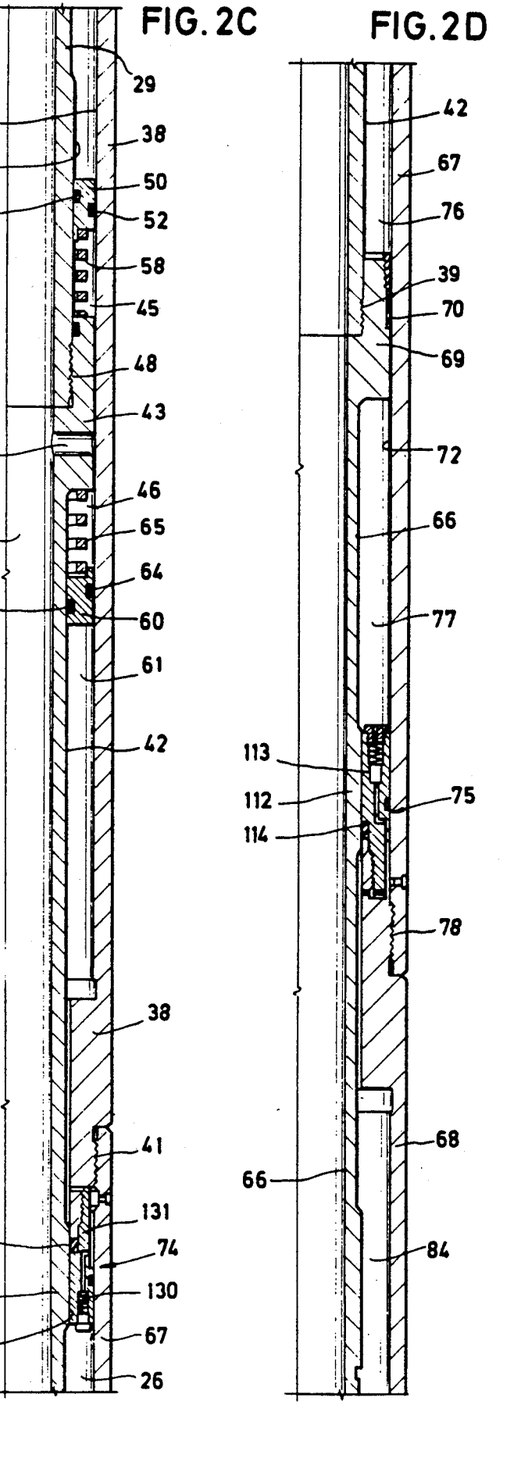
Figure 2E:
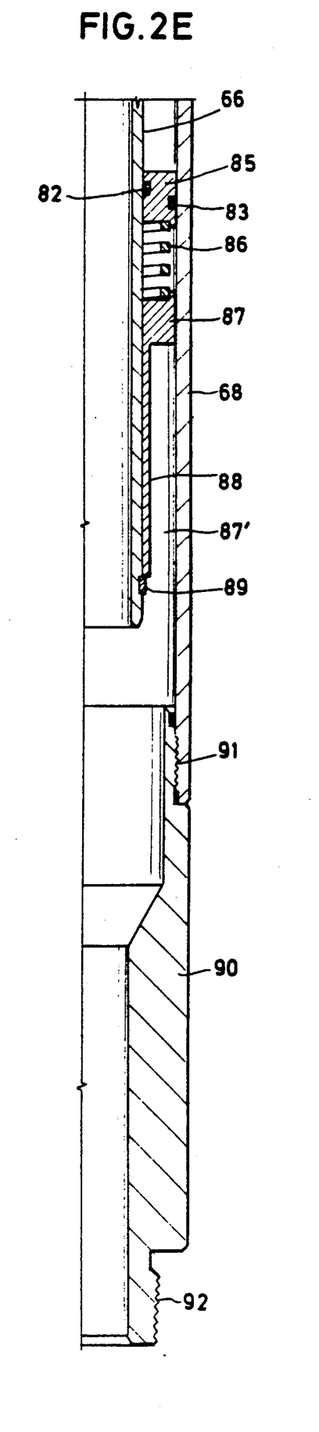

As shown in FIG. 2C, the upper pressure mandrel 42 is provided with a short length section 100 having an outer surface 101 of increased diameter. The surface 101 is arranged to sealingly engage a high pressure seal on the inner surface of the metering assembly 74 when the mandrel assembly 20 is located in the cocked position shown in the drawings. The engagement of the surface 101 with such seal dictates that any upward movement of the mandrel 20 and its piston 69 must be accompanied by the metering of hydraulic oil through the assembly 74. In like manner, when a lower valve head 112 on the mandrel system 66 is engaged with a high pressure seal in the bore of the lower restriction assembly 75, any further downward movement of the mandrel 20 and the piston 69 must be accompanied by the metering of oil through the lower restriction assembly 75. Inasmuch as the restriction assemblies 74 and 75 are identical but opposably disposed, only the lower restriction assembly 75 will be described in detail.

Figure 3:
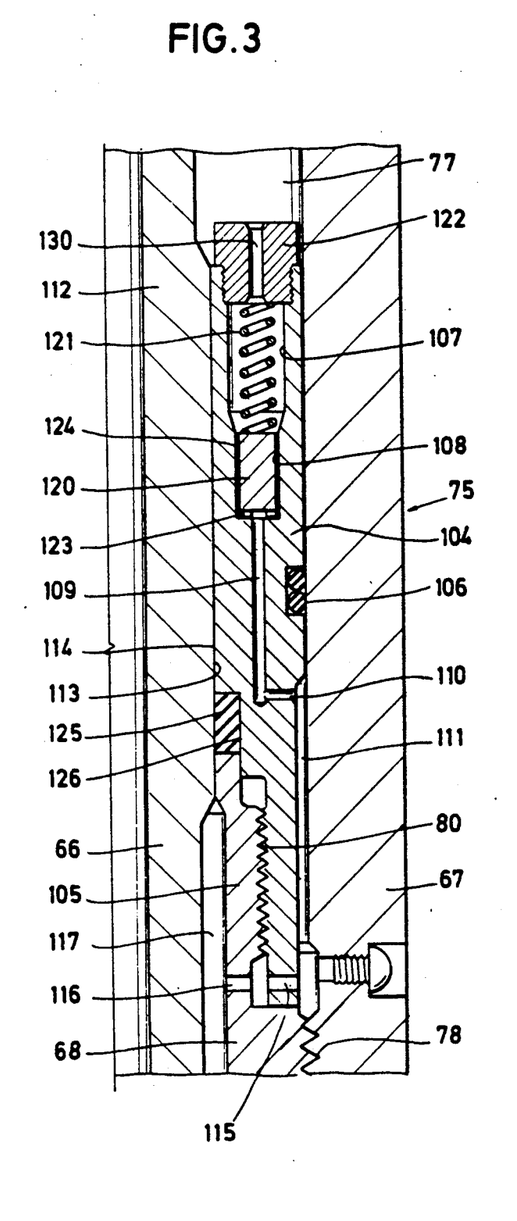
FIG. 3 is an enlarged, fragmentary cross-sectional view of the metering system.

Referring now to FIG. 3, the lower metering assembly 75 includes an elongated sleeve 104 that is threaded at 80 to the upper end portion 105 of the compensating housing 68. The sleeve 104 is sealed with respect to the pressure housing 67 by seal ring 106. As axial bore 107 is formed in the upper portion of the sleeve 104 and extend downward to a reduced diameter metering bore 108. The lower wall of the bore 108 is intersected by an axial port 109 which leads down to a lateral port 110 that communicates with an annular space 111 between the pressure housing 67 and the lower portion of the sleeve 104. A pair of lateral ports 115 and 116 communicate the space 111 with the annular area 117 between the pressure mandrel 66 and the compensating housing 68. The area 117 leads down to the compensating chamber 84.

A metering valve pin 120 is snugly received in the bore 108, and is biased downward by a coil spring 121 that is held by a cap 122. The cap 122 can have a hole 130 therethrough, or radial ports can be formed through the walls of the upper portion of the sleeve 104 below the cap 122. The lower end of the pin 120 preferably is provided with a diametrically extending groove 123 or other means to ensure that all the flow restriction is provided by the clearance 124 between the outer wall of the pin 120 and the inner wall of the bore 108. The clearance 124 is designed to be quite small to provide optimum jarring characteristics in view of downhole temperatures and the viscosity of the hydraulic oil that is used in the system.

A high pressure seal assembly 125 is mounted in an annular recess 126 in the sleeve 104 near the lower end of the bore surface 114. The lower end of the recess 126 is defined by the upper end surface of the portion 105 of the compensating housing 68. Once the seal 125 engages the outer surface 113 of the mandrel head 112, it prevents any leakage of oil through the bore 115 of the metering sleeve 104 as the mandrel 66 is moved further downward. So long as the seal 125 engages the outer surface of the head 112, downward movement of the mandrel 66 must be accompanied by the metered flow of oil past the valve pin 120 from the high pressure chamber 77 into the compensating chamber 84. Once the upper end of the head 112 clears the seal 125, a large bypass area is immediately provided so that the mandrel 20 can drop within the housing 21 and impact the hammer surface 33 with the anvil surface 34.

As previously mentioned, the upper metering assembly 74 is the mirror image of the lower assembly 75, and includes an upwardly seating valve pin 120 located within an axial bore formed in a sleeve 131 that is attached to the compensating housing 38. The sleeve 131 carries a high pressure seal 132 near its upper end that coacts with the valve head 100 on the mandrel 42 in a manner such that once the upper end surface of the head 100 engages the seal 132, oil must meter past the pin 120 from the high pressure chamber 76 into the compensating chamber 61 for any further upward movement to occur. This delays upward movement of the mandrel assembly 20 so that a strain can be taken in the pipe string at the surface. Once the head 100 clears the seal 132, the mandrel 20 is accelerated upward to cause a jarring blow in the upward direction.

OPERATION

The parts are assembled as shown in the drawings and the high pressure chamber 76 and 77 and the compensating chamber 61 and 84 are filled with a suitable hydraulic oil. The spline chamber 57 also can be filled with hydraulic oil, or an oil more suitable for heavy duty lubrication can be used. The jar assembly 13 is connected in the drill collar string near the upper end thereof as the drill string is lowered into the borehole, and initially is extended with the nut 30 engaging the lower end of the splines 26. The jar 13 remains in tension during drilling if it is located above the neutral point in the drill string. As drilling mud is pumped down through the jar 13, an extension force is created by the higher internal pressure above the nozzles of the bit 11. The splines 25 and 26 transmit torque from the mandrel 20 to the housing 21 which is connected to the drill collars there below.

The drilling mud inside the mandrel 20 can not contaminate the high pressure seals 125 and 132 or the piston seal 70 because the oil-filled chambers 61, 76, 77, and 84 are isolated from the mud by the floating pistons 60 and 85. The splines chamber 57 also is isolated from the mud by the floating piston 50. The spline chamber 57 and the compensating chambers 61 and 84 are all subjected to the pressure inside the mandrel 20 by the ports 44 and the lateral space 87. Therefore the seals and the oil are not exposed to the mud in the annulus which contain cuttings or other debris.

In the event the collar string below the jar 13, or the bit, should become stuck in the borehole, the jar 13 can be operated to hit upward blows as follows. The mandrel 20 is lowered within the housing 21 to position the upper mandrel head 100 and the lower head 112 adjacent the respective metering sleeves 131 and 104. When the lower portion of the head 100 engages the high pressure seal 132, the pin valve 120 opens to allow oil to flow from the compensating chamber 61 into the pressure chamber 76. When the lower head 112 engages the high pressure seal 125, a resistance to downward movement will be seen on the rig weight indicator. No further weight is slacked off, and the pipe is lifted. Since the head 100 is in engagement with the high pressure seal 132, upward mandrel movement causes the pin valve 120 to seat and restrict the flow of oil from the pressure chamber 76 into the compensating chamber 61. The restricted flow affords the driller time to stretch the drill string and store potential energy. Once the head 100 meters upward and clears the high pressure seal 132, the mandrel 20 is accelerated upward to bring the nut 30 against the lower end of the splines 26 in a violent manner that delivers a jarring blow to the struck object. The pipe can be repeatedly lowered and then stretched to deliver a series of blows to the object until it is driven loose.

To jar downward, the mandrel 20 is lowered within the housing 21 until a resistance to further lowering is seen on the weight indicator which signals that the lower mandrel head 112 has encountered the high pressure seal 125 on the lower metering assembly 75. The upper head 100 does not retard downward movement because the pin valve 120 opens when the seal 132 is encountered. The driller then slacks off weight on the mandrel 20 which causes the lower head 112 to pass slowly through the sleeve 104 as the piston 69 causes the oil to meter past the pin valve 120 into the compensating chamber 84. When the upper outer surface of the head 112 clears the high pressure seal 125, the mandrel assembly 20 drops suddenly downward to bring the hammer surface 33 against the anvil surface 34. The impact blow that is produced is transmitted by the housing 21 to the stuck object therebelow. Repeated jarring blows can be struck by raising the mandrel 20 until a resistance is indicated as the head 100 first engages the seal 132, which cocks the lower head 112 and sleeve 104, and then slacking off weight on the jar 13 to cause it to trip.

The floating pistons 60, 85, and 50 ensure that the pressures in the compensating and spline chambers are substantially equalized with the pressures in the bore 47 of the mandrel 20, and allow slight volume changes due to thermal effects. The pressure compensation to the inside, rather than the outside, yields several benefits. Holes in the housing 21 create weak points which are cyclically stresses during bent rotation which can lead to fatigue failures. When a jar that has outside compensation is pulled out of the hole, mud runs out of cavities down the outside of the tool, which can cause concern that the tool is leaking. Moveover, the higher pressures inside the jar than in the annulus due to pressure drop across the bit nozzles ensures that any oil leakage past seals will be to the outside so as to prevent deterioration of the seals by particles in the mud in the annulus.

Figure 4:
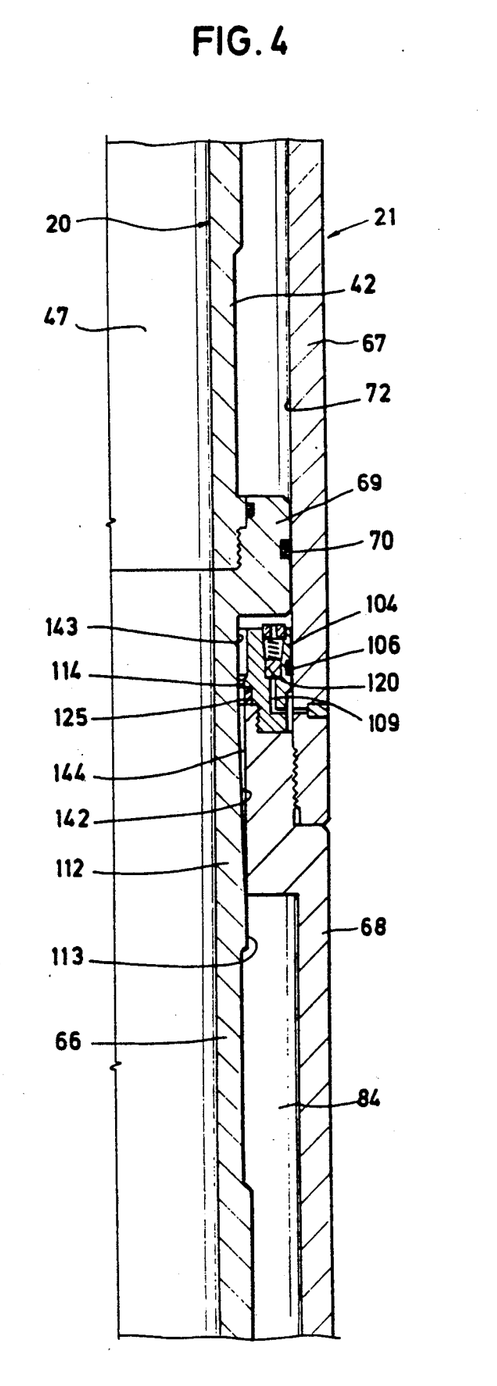
FIG. 4 is a fragmentary cross-sectional view of a modification of the present invention.

Another preferred embodiment of the present invention is shown in FIG. 4. When drilling a directional borehole having high inclination, it can be necessary to slack off a relatively high amount of weight to force the drill string to the bottom of the hole. It is possible that such high weight can cause a jar to trip and jar down. If this should occur, a weight release action will occur at the surface, and possibly even a downward impact. Generally speaking, this will not cause any problems at the surface because the pipe is under the firm control of the rig elevators. But if the jar is completely closed and the pipe is set in the slips, such as when adding another joint or stand of pipe, the drill collars below the jar could begin moving downward. The jar then acts like a slip joint until the end of the free travel between the housing and the mandrel is reached, and the jar cocks. The sudden stop of the bottom hole assembly below the jar when the jar cocks can send a tensile shock wave through the drill pipe to the surface which could conceivably knock the pipe out of the slips.

To alleviate this potential problem, a means is provided to restrict free extension of the jar when it is extending from the closed position and to allow relatively unrestricted movement when the jar is closing from the cocked position. In other words the damping afforded by the improvement is directionally biased. This is accomplished by providing a frusto-conical surface 142 on the mandrel section 66 that tapers from the upper outer diameter 113 of the lower valve head 112 to the normal diameter 143 of the mandrel section. The annular area 144 defined between the conical surface 142 and the bore surface 114 of the metering sleeve 104 provides an oil bypass passageway that gradually reduces in size to zero as the housing 21 moves downward relative to the mandrel 20 from the cocked position shown in FIGS. 2A-2E, and the high pressure seal 125 approaches the valve head surface 113. On the other hand the bypass passageway 144 gradually increases in size as the mandrel 20 moves downward relative to the housing 21 from the cocked position during downward jarring. Downward travel of the mandrel 20 is restricted only at the beginning of the stroke, and the effect diminishes rapidly so that the impact occurs at virtually the same speed as if the bypass restriction were absent. Of course after the oil flow is cut off in the bypass area 144 the flow must go entirely through the metering passage defined by the valve pin 120 in the restriction sleeve 104.

The same damping principle can be achieved in a mechanical drilling jar of the type shown in Kisling U.S. Pat. No. 3,709,478, by providing a conical internal surface on the lower adjusting sleeve which cooperates with an external upset or a removable sleeve on the adjacent outer surface of the mandrel. The conical surface inclines upward and outward, and is arranged such that the smaller diameter thereof surrounds the sleeve or upset with very small clearance in the cocked position of the housing. Thus if the jar is closed and the mandrel starts moving downward, the bypass flow area between the conical surface and the outer surface of the sleeve piston will gradually reduce to almost zero in order to decelerate such downward movement and prevent the generation of a tensile shock wave when the jar cocks.

It now will be recognized that a new and improved hydraulic drilling jar has been provided which embodies all the objectives and features of the invention. The pin valves act to delay mandrel movement and as check valves depending upon the direction of oil flow. An annular orifice is more difficult to clog than a hole because holes tend to bridge over with lint particles and the like. The pins valves are self-cleaning in that any dirt trapped in the annular orifice is flushed when the jar recocks. The pin valves are easy to replace with other pins of a different size to vary the operational characteristics of the jar. Some operational changes can be made by simply replacing the oil with one with a different viscosity, which can be done without tool disassembly. Substantially the same metering mechanism can be used for both the up and down hitting chambers, except that a pin valve with a lesser outer diameter typically is used in the lower mechanism 75. The increase clearance provides a tripping load that is about one-third the upward jarring load. Since there are two independently sealed chambers, the jar can still be operated in one direction even though the other chamber may not hold pressure. Since the usual sliding sleeve piston is not used as a tripping device in the present invention, sliding wear is eliminated that would otherwise reduce the effectiveness of such valves. The pin valves disclosed herein are much less expensive to manufacture than sleeve pistons where very tight tolerances must be maintained. A jar in accordance with this invention can be either an up or a down hitting jar, or can be arranged to hit in both directions as illustrated and described herein.

Since certain changes or modifications may be made in the disclosed embodiments without departing from the inventive concepts involved, it is the aim of the appended claims to cover all such changes and modifications falling within the true spirit and scope of the present invention.

What is claimed is:

1. Hydraulic jar apparatus adapted for use in drilling applications, comprising: a mandrel member telescopically disposed within a housing member for movement relative thereto between extended and retracted positions; means for preventing relative rotation of said members; impact surfaces on said members adapted to be brought against one another by telescoping movement of said mandrel member to one of said positions; and means for temporarily restraining movement of said mandrel member toward said one position including restriction means on said housing member having an internal bore and seal means in said internal bore, piston means on said mandrel member sealingly slidable within cylinder means in said housing member, said piston means being axially spaced from said restriction means to provide an annular pressure chamber that is adapted to be filled with hydraulic oil, enlarged diameter surface means on said mandrel member engageable with said seal means in said internal bore of said restriction means for preventing leakage therebetween, and metering passage means in said restriction means for restricting the flow of oil from said pressure chamber as said piston means is moved toward said restriction means, said restraining means being effective to delay movement of said mandrel member relative to said housing member until said surface means disengages from said seal means in said bore.

2. The apparatus of claim 1 wherein said restriction means further includes a seating bore in communication with said chamber, and a valve member positioned in said seating bore, there being a small clearance between said valve member and said seating bore that provides said metering passage means.

3. The apparatus of claim 2 wherein said seating bore has a cylindrical wall, said valve member being a cylindrical pin that is snugly received in said seating bore.

4. The apparatus of claim 2 further including spring means for biasing said valve member into said seating bore, said spring means allowing said valve member to disengage from said seating bore to permit flow of oil into said chamber.

5. The apparatus of claim 3 further including spring means for biasing said pin into said seating bore, said spring means allowing said pin to disengage from said seating bore to permit flow of oil into said chamber.

6. The apparatus of claim 3 wherein said pin has flow slots in the inner end thereof to assure that substantially all of the restriction to the flow of oil takes place in the annular clearance space between the outer wall surface of said pin and the inner wall surface of said seating bore.

7. The apparatus of claim 1 wherein said surface means on said mandrel member is provided by an enlarged diameter section thereof, whereby oil can flow freely between said mandrel member and said internal bore of said restriction means when said enlarged diameter section is axially spaced with respect to said restriction means.

8. The apparatus of claim 1 further including an annular compensating chamber formed between said mandrel member and said housing member adjacent said high pressure chamber and on the opposite side of said restriction means therefrom, said compensating chamber being filled with hydraulic oil and adapted to receive oil flowing through said metering passage means as said piston means moves relatively toward said restriction means and to supply oil to said high pressure chamber as said piston means moves relatively away from said restriction means.

9. The apparatus of claim 8 further including a floating piston defining the outer end of said compensating chamber, said floating piston being movable to accommodate changes in volume of said compensating chamber; and port means in said mandrel member for communicating the pressure of drilling fluids inside the bore of said mandrel member to said floating piston.

10. The apparatus of claim 9 further including seal means on said mandrel and housing members for enclosing said relative rotation preventing means to permit said relative rotation preventing means to function in a bath of oil, one of said seal means being another floating piston that is sealingly engaged between said mandrel and housing members, said port means also communicating the pressure of drilling fluids in the bore of said mandrel member to said other floating piston to equalize such pressure with the pressure of said oil bath.

11. Hydraulic jar apparatus adapted for use in a drilling string comprising: telescopically disposed mandrel and housing members adapted for relative movement between extended and retracted relative positions; slidably engaged means on said members for preventing relative rotation; first impact surfaces on said members adapted to be brought against one another by telescoping movement to said extended position, and second impact surfaces on said members adapted to be brought against one another by telescoping movement to said retracted position; first means for restraining movement of said mandrel member toward said extended position including first restriction means on said housing member having an internal bore and seal means in said internal bore, piston means on said mandrel member sealingly slidable within cylinder means on said housing member, said piston means being axially spaced from said first restriction means to provide a first annular, oil-filled pressure chamber, first enlarged diameter surface means on said mandrel engageable with said seal means in said internal bore of said first restriction means for preventing leakage therebetween, and first flow metering passage means in said first restriction means for restricting the flow of oil from said first pressure chamber therethrough as said piston means is moved toward said first restriction means, said first restraining means being effective to delay movement of said mandrel member toward said extended position until said first surface means disengages from said seal means; and second means for restraining movement of said mandrel member toward said retracted position including second restriction means on said housing member having an internal bore and seal means in said internal bore, said piston means being axially spaced from said second restriction means to provide a second, annular oil-filled pressure chamber, second enlarged diameter surface means on said mandrel member engageable with said seal means in said internal bore of said second restriction means for preventing leakage therebetween, and second flow metering passage means in said second restriction means for restricting the flow of oil therethrough as said piston means is moved toward said second restriction means, said second restraining means being effective to delay movement of said mandrel member toward said retracted position until said second surface means disengages from said seal means in said internal bore of said second restriction means.

12. The apparatus of claim 11 wherein said first restriction means includes a first seating bore in communication with said first pressure chamber and a first valve member positioned in said first seating bore, there being a small clearance between said first valve member and said seating bore that provides said first metering passage means; and wherein said second restriction means includes a second seating bore in communication with said second pressure chamber and a second valve member positioned in said second seating bore, there being a small clearance between said second valve member and its seating bore that provides said second metering passage means.

13. The apparatus of claim 12 wherein each of said seating bores has a cylindrical wall, and wherein said first valve member is a cylindrical pin that is snugly received in said first seating bore, and said second valve member also is a cylindrical pin that is snugly received in said second seating bore.

14. The apparatus of claim 13 further including first spring means for biasing said first valve member into said first seating bore, said first spring means allowing said first valve member to disengage from said first seating bore to permit flow of oil into said first pressure chamber; and second spring means for biasing said second valve member into said second seating bore, said second spring means allowing said second valve member to disengage from said second seating bore and permit flow of oil into said second pressure chamber.

15. The apparatus of claim 13 wherein said first and second cylindrical pins each have flow slots on the inner ends thereof to assure that substantially all of the restriction to the flow of oil takes place in the annular clearance spaces between the outer surfaces of said pins and the inner wall surfaces of said seating bores.

16. The apparatus of claim 11 wherein said first and second surface means on said mandrel member are each provided by an enlarged diameter section thereof, whereby oil can flow freely between said mandrel member and said internal bore of said restriction means when said enlarged diameter sections are axially spaced from said restriction means.

17. The apparatus of claim 11 further including a first annular compensating chamber between said mandrel member and said housing member adjacent said first restriction means and on the opposite side thereof from said first pressure chamber, said first compensating chamber being filled with hydraulic oil and adapted to receive oil flowing through said first metering passage means from said first pressure chamber as said piston means moves relatively toward said first restriction means and to supply oil to said first pressure chamber as said piston means moves relatively away from said first restriction means; and a second annular compensating chamber adjacent said second restriction means and on the opposite side thereof from said second pressure chamber, said second compensating chamber being filled with hydraulic oil and adapted to receive oil flowing through said second metering passage means from said second pressure chamber as said piston means moves relatively toward said second restriction means, and to supply oil to said second pressure chamber as said piston means moves relatively away from said second restriction means.

18. The apparatus or claim 17 further including a first floating piston defining an end of said first compensating chamber, said first floating piston being movable to accommodate changes in the volume of said first compensating chamber; second floating piston means defining an end of said second compensating chamber, said second floating piston being movable to accommodate changes in the volume of said second compensating chamber; and means for communicating each of said floating pistons with the pressure of fluids inside said mandrel member.

19. The apparatus of claim 18 further including seal means on said mandrel and housing members for enclosing said relative rotation preventing means to enable said preventing means to function in a bath of oil, said seal means including a sliding seal and a third floating piston; and means for communicating the pressure of fluids inside said mandrel member with said third floating piston which transmits such pressure to said oil bath.

20. The apparatus of claim 11 further including a conical surface on said mandrel member that inclines upward and inward at a shallow angle from the upper outer edge of said second enlarged diameter surface means to the outer surface of said mandrel member to provide a bypass area between said internal bore of said second restriction means that gradually diminishes in size as said housing member moves downward relative to said mandrel member.

21. A hydraulic jar comprising: inner and outer telescopically arranged tubular members that are movable longitudinally relative to each other between limit positions at which jarring actions occur; upper and lower movable seal means between said members for defining an oil-filled chamber therebetween; piston means on said inner member engaging cylinder means in said outer member for dividing said chamber into upper and lower portions, said upper portion including an upper high pressure section and an upper compensating section, said lower portion including a lower high pressure section and a lower compensating section; first restriction means on said inner and outer members between said upper high pressure section and said upper compensating section for restricting the flow of oil from said upper high pressure section to said upper compensating section as said piston means moves upward in said cylinder means in response to said relative movement in one direction, said first restriction means becoming inactive after a predetermined amount of said longitudinal relative movement has occurred; and second restriction means on said inner and outer members between said lower high pressure section and said lower compensating section for restricting the flow of oil from said lower high pressure section to said lower compensating section as said piston means moves downward in said cylinder means in response to said relative movement in the other direction, said restriction means becoming inactive after a predetermined amount of said longitudinal relative movement has occurred.

22. The apparatus of claim 21 further including passage means for communicating each of said upper and lower movable seal means with the pressure of fluids in the bore of said inner tubular member.

23. The apparatus of claim 22 further including slidable spline mean for transmitting torque applied to one of said members to the other of said members.

24. The apparatus of claim 23 further including second upper and lower seal means for enclosing said spline means in an oil-filled spline chamber, one of said second seal means being a movable seal; and passage means for communicating said one movable seal with the pressure of fluids inside of said inner tubular member.

25. The apparatus of claim 21 wherein said first restriction means comprises a sleeve on said outer member having an internal cylindrical bore and a high pressure seal inside said bore, a first enlarged diameter valve head on said inner member adapted to engage said high pressure seal to prevent fluid leakage, and check valve means in said sleeve for providing a high restriction to the flow of oil from said upper high pressure chamber section to said upper compensating section so long as said valve head engages said high pressure seal.

26. The apparatus of claim 25 where said check valve means includes a cylindrical pin that is seated in a cylindrical bore in said sleeve, the annular clearance space between the outer periphery of said pin and the wall of said bore providing the restricted flow passage for said oil.

27. The apparatus of claim 26 wherein said check valve means further includes spring means for biasing said pin into seating engagement with said bore, said spring means permitting said pin to shift out of said bore in response to flow of oil from said upper compensating section with said upper high pressure chamber section.

28. The apparatus of claim 25 wherein said second restriction means comprises a second sleeve on said outer member having an internal cylindrical bore and a second high pressure seal inside said bore, a second enlarged diameter valve head on said inner member adapted to engage said second high pressure seal to prevent fluid leakage, and second check valve means in such second sleeve for providing a high restriction to flow of oil from said lower high pressure chamber to said lower compensating section so long as said second valve head engages said second high pressure seal.

29. The apparatus of claim 28 wherein said second check valve means include a cylindrical pin that seats in a cylindrical bore in said second sleeve, the annular clearance space between the outer periphery of said pin and said last-mentioned bore providing the restricted flow passage for said oil.

30. The apparatus of claim 29 wherein said second check valve means further includes spring means for permitting said last-mentioned pin to shift outwardly of its bore in response to flow of oil from said lower compensating section into said lower high pressure chamber.

31. A hydraulic well jar comprising: a mandrel member having an enlarged diameter valve head and piston means spaced from said valve head; a housing member having cylinder means therein, said piston means engaging said cylinder means to form a high pressure chamber adapted to be filled with hydraulic oil; restriction means on said housing member having an internal cylindrical bore; a high pressure seal means in said bore, said mandrel member extending though said bore, said piston means being freely movable toward said restriction means until said valve head engages said high pressure seal means; and metering means included in said restriction means through which said oil must flow as said piston means continues to move toward said restriction means, said metering means providing a high restriction to such flow until said valve head disengages from said high pressure seal means to provide a bypass around said restriction means.

32. The apparatus of claim 31 wherein said restriction means includes a sleeve member and said metering means including a flow passage through said sleeve member, said flow passage defining a cylindrical valve seat, and a pin member received in said valve seat with a close tolerance fit, the clearance between said pin member and said seat providing a metering orifice for said flow.

33. The apparatus of claim 32 further including yieldable means for biasing said pin member into said seat, said yieldable means permitting said pin member to shift out of said seat in response to flow of oil into said high pressure chamber.

34. The apparatus of claim 33 further including movable seal means between said mandrel member and said housing member spaced from said restriction means to provide on oil-filled compensating chamber; and passage means for communicating the pressure of fluids in the bore of said mandrel member to said movable seal means.

35. The apparatus of claim 34 further including slidable means for preventing relative rotation of said mandrel and housing members; and a sliding seal means and a movable seal means between said members for enclosing said relative rotation preventing means, said passage means also communicating the pressure of fluid in the bore of said mandrel member with said last mentioned movable seal means.

36. The well jar of claim 31 further including damping means providing a gradually reducing flow area between said mandrel member and said bore of said restriction means as said housing member and said restriction means move downward relative to said mandrel member.

37. The well jar of claim 36 wherein said damping means comprises a section of said mandrel member having a conical, upwardly facing outer surface, said section being adjacent said enlarged diameter valve head and tapering inwardly from the outer surface thereof.

38. In a hydraulic jar having mandrel and housing member that can be telescoped to hit a jarring blow on a stuck object, there being one chamber between said members that is filled with hydraulic oil, the improvement comprising compensating means for equalizing the pressure of the oil in said chamber with the pressure of fluids in the bore of said mandrel member, said compensating means including a floating piston and port means through the wall of said mandrel member adjacent said piston.

39. A hydraulic well jar, comprising: mandrel and housing members movable longitudinally relative to one another, said housing member having an inwardly directed shoulder with a flow restricting passage means therethrough: piston and cylinder means on said mandrel and housing members for displacing hydraulic oil under pressure through said passage means to provide a restraint to longitudinal relative movement over a predetermined distance; and means on said mandrel member and said shoulder for opening a bypass around said passage means after relative movement over said predetermined distance has occurred.

40. In a jar apparatus having inner and outer tubular members that are relatively movable between a closed position and a cocked position, the improvement comprising conical surface means on one of said members and piston means on the other of said members, said conical surface means and piston means being located in an oil filled chamber, the lesser diameter of said conical surface means being substantially equal to the diameter of said piston means, whereby longitudinal relative movement of said members provides a gradually decreasing area for the flow of oil between said conical surface means and said piston means to damp said longitudinal relative movement toward said cocked position.

* * * * *